(12) United States Patent
Pasumarti et al.

(10) Patent No.: US 11,459,878 B2
(45) Date of Patent: Oct. 4, 2022

(54) WIRELESS MICRO-SENSORS SYSTEM FOR MONITORING DEEP SUBSURFACE OPERATIONS

(71) Applicant: Battelle Memorial Institute, Columbus, OH (US)

(72) Inventors: Ashwin Pasumarti, King of Prussia, PA (US); Joel Sminchak, Columbus, OH (US); Mark Moody, Columbus, OH (US)

(73) Assignee: Battelle Memorial Institute, Columbus, OH (US)

( * ) Notice: Subject to any disclaimer, the term of this patent is extended or adjusted under 35 U.S.C. 154(b) by 0 days.

(21) Appl. No.: 17/193,768

(22) Filed: Mar. 5, 2021

(65) Prior Publication Data

US 2021/0277776 A1   Sep. 9, 2021

Related U.S. Application Data

(60) Provisional application No. 62/985,447, filed on Mar. 5, 2020.

(51) Int. Cl.
*E21B 47/13* (2012.01)
*E21B 47/01* (2012.01)
*H02J 50/80* (2016.01)

(52) U.S. Cl.
CPC ............. *E21B 47/13* (2020.05); *E21B 47/01* (2013.01); *H02J 50/80* (2016.02)

(58) Field of Classification Search
None
See application file for complete search history.

(56) References Cited

U.S. PATENT DOCUMENTS

| | | | | |
|---|---|---|---|---|
| 10,072,495 B1* | 9/2018 | Gooneratne | ............ | E21B 47/00 |
| 2011/0192594 A1* | 8/2011 | Roddy | ................. | E21B 47/005 |
| | | | | 166/250.01 |
| 2014/0174732 A1* | 6/2014 | Goodwin | .............. | E21B 47/005 |
| | | | | 166/255.1 |
| 2016/0266086 A1* | 9/2016 | Von Herzen | ......... | G01N 29/262 |
| 2017/0204719 A1 | 7/2017 | Babakhani | | |
| 2018/0010449 A1 | 1/2018 | Roberson et al. | | |

FOREIGN PATENT DOCUMENTS

| | | | | | |
|---|---|---|---|---|---|
| CN | 2377350 Y | * | 5/2000 | ............ | E21B 47/08 |
| EP | 2404028 A2 | | 1/2012 | | |

* cited by examiner

*Primary Examiner* — Curtis A Kuntz
*Assistant Examiner* — Jerold B Murphy
(74) *Attorney, Agent, or Firm* — Volpe Koenig (57) ABSTRACT

Described herein is a method and techniques for subsurface monitoring. The system includes a downhole including a casting with a lumen, a wireless power transmitter within the casting, a micro-sensor cement mixture including a plurality of micro-sensors mixed with a cement, the micro-sensor cement mixture on a surface of the casting opposite from the lumen, a relay system including a plurality of relays, each of the plurality of relays including a charging component and a surface receiver. The wireless power transmitter configured to transmit a wireless power signal. At least one micro-sensor of the plurality of micro-sensors is configured to receive the wireless power signal, sense at least one attribute, and transmit a sensed signal. A series of relays are configured to receive the sensed signal and re-transmit the sensed signal and a surface receiver is configured to receive the sensed signal at a third time after the second time.

10 Claims, 5 Drawing Sheets

WIRELESS MICRO-SENSORS SYSTEM FOR MONITORING DEEP SUBSURFACE OPERATIONS

CROSS REFERENCE TO RELATED APPLICATION

This application claims the benefit of U.S. Provisional Application No. 62/985,447, filed Mar. 5, 2020, the contents of which are incorporated by reference as if fully set forth.

BACKGROUND

Downholes (also referred to as boreholes and wellbores, herein) are used in a number of different industries that benefit from the extraction of a material from the ground and/or injection of a material into the ground. Downholes can be used for the extraction of water or other liquids (e.g., petroleum), or gases (e.g., natural gas) and can also be used for geotechnical investigations, environmental site assessments, mineral exploration, geothermal installations, underground storage, or the like.

The depth, into the ground, that is reached by a downhole can vary based on the application associated with the downhole and may be determined by environmental factors. For example, a downhole created for the purpose of extracting a liquid (e.g., water or gas) may have a depth determined by the location of the given liquid under the surface.

Deep subsurface monitoring including detection of environmental and instrument properties often indicate changes based on the depth at which such properties are measured. Further, environmental and/or instrument properties that are present at greater depths within a downhole are often critical to monitor. Such monitoring can help detect changes that may trigger an action or be a cause for suspending an ongoing action.

SUMMARY

Described herein is a method and techniques for subsurface monitoring. The system comprises a downhole comprising a casting including a lumen, a wireless power transmitter within the casting, a micro-sensor cement mixture including a plurality of micro-sensors mixed with a cement, the micro-sensor cement mixture placed on a surface of the casting opposite from the lumen, a relay system including a plurality of relays, each of the plurality of relays comprising a charging component and a surface receiver. The wireless power transmitter is configured to transmit a wireless power signal. At least one micro-sensor of the plurality of micro-sensors is configured to receive the wireless power signal, sense at least one attribute, and transmit a sensed signal. A first relay of the relay system is configured to receive the sensed signal and re-transmit the sensed signal at a first time. A second relay of the relay system is configured to receive the re-transmitted sensed signal and re-transmit the sensed signal at a second time, after the first time and a surface receiver (or surface receiver system) is configured to receive the sensed signal at a third time after the second time.

BRIEF DESCRIPTION OF THE DRAWINGS

A more detailed understanding may be had from the following description, given by way of example in conjunction with the accompanying drawings wherein.

DETAILED DESCRIPTION OF EMBODIMENTS

Examples of different sensor, power, and transmitting device implementations will be described more fully hereinafter with reference to the accompanying drawings. These examples are not mutually exclusive, and features found in one example may be combined with features found in one or more other examples to achieve additional implementations. Accordingly, it will be understood that the examples shown in the accompanying drawings are provided for illustrative purposes only and they are not intended to limit the disclosure in any way. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element such as a layer, region or substrate is referred to as being "on" or extending "onto" another element, it may be directly on or extend directly onto the other element or intervening elements may also be present. In contrast, when an element is referred to as being "directly on" or extending "directly onto" another element, there are no intervening elements present. It will also be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. It will be understood that these terms are intended to encompass different orientations of the element in addition to any orientation depicted in the figures.

Relative terms such as "below" or "above" or "upper" or "lower" or "horizontal" or "vertical" may be used herein to describe a relationship of one element, layer or region to another element, layer or region as illustrated in the figures. It will be understood that these terms are intended to encompass different orientations of the device in addition to the orientation depicted in the figures.

Advancements in micro-sensors have facilitated sensor deployment to track and optimize a wide variety of industrial processes and environmental settings. Due to the challenges of downhole sensor deployment, micro-sensor technology has not yet been fully realized in the field of deep subsurface monitoring, such as within downholes. Implementations of the disclosed subject matter provide a wireless micro-sensor system for deep subsurface environments.

As described in further detail herein, the implementations of the disclosed subject matter provide a system for downhole monitoring. The system and techniques disclosed herein may be implemented for downholes that are actively utilized for one or more purposes (e.g., extraction of water or other liquids (e.g., petroleum), or gases (e.g., natural gas) and may also be used for geotechnical investigations, environmental site assessments, mineral exploration, geothermal installations, underground storage, or the like) or for abandoned downholes that may be plugged with a material (e.g., cement). For example, the micro-sensors disclosed herein may be mixed with cement that is deposited as part of the formation of the downhole such that the cement may be add stability to the downhole's infrastructure. Alternatively, or in addition, the micro-sensors disclosed herein may be mixed with cement that is deposited into an abandoned downhole, where the cement forms the material that is used to plug the abandoned downhole.

The system and techniques disclosed herein may, for example, be implemented to analyze subsurface $CO_2$ storage. Subsurface data may be collected with high vertical resolution and deploying the system disclosed herein across multiple downholes may produce a network of real-time monitoring points above $CO_2$ storage zones, without an added expense of drilling new downholes. Such data collected using the techniques and system disclosed herein may allow for accurate tracking and modelling of the subsurface movement of $CO_2$ plumes. It will be understood that analyzing subsurface $CO_2$ storage is provided only as an example and that the implementations disclosed herein may be applied for a number of other purposes.

The system and techniques disclosed herein include a plurality of micro-sensors dispersed at a plurality of depths within cement that is dispersed within a downhole. As an example, the micro-sensors may be have an effective radius of $1$ $cm^3$. The size of the micro-sensors size may be small enough such that the integrity of the cement is not materially altered by the presence of the micro-sensors that are mixed in with the cement and also large enough to be house applicable micro-electronics such as sensing components, battery, etc. According to implementations, the micro-sensors may have an effective radius that is smaller than $1$ $cm^3$ or larger than $1$ $cm^3$. The cement may be annular cement that surrounds a cylindrical casting inserted into the downhole. The annular cement may be in contact with the foundation or strata that forms or shapes the boundaries of the downhole. The cement may be in direct contact with rock strata at or towards the end of a downhole in a direction facing away from the ground's surface (i.e., earth's surface). However, in another implementation, sensor rings may be fastened around a casing at pre-determined intervals.

According to an implementation, the micro-sensors may be coated with an encapsulating material (e.g., risen). The encapsulating material may shield the micro-sensors from environmental effects and/or shearing forces during mixing with the cement, from pumping downhole, and from cement curing. The encapsulating material may be made of material that does not interfere with a micro-sensor's operation (e.g., wireless transmission, receiving signals to charge battery, etc.). Further, the encapsulating material may prevent or mitigate the micro-sensor from settling within cement and may promote even distribution of the sensors is supported throughout the desired depth.

A wireless power transmitter system may be provided at or towards the surface of the downhole facing away from the ground's surface (e.g., may be provided at a bottom surface). The wireless power transmitter system may include a battery that is configured to broadcast power wirelessly, such as via radiofrequency (RF) transmission, sonic transmission, or the like. The plurality of micro-sensors or sensor rings may be configured to receive at least a portion of the power wirelessly broadcasted by the wireless power transmitter (e.g., from the RF waves transmitted by the battery).

Upon receipt of the power transmitted by the wireless power transmitter, the micro-sensors or sensor rings may switch from a dormant state to an activated state using a portion of the received power from the wireless power transmitter and may sense at least one attribute (e.g., a temperature, a stress, a pressure, a density, a presence of an element, molecule, or compound, a saturation, a pH level, or the like), when activated, using a portion of the received power from the wireless power transmitter. The micro-sensors or sensor rings may sense the at least one attribute, and the at least one attribute may be analyzed by a processor to determine a $CO_2$ presence. Such a processor may be located at a relay, or at a above surface receiver, as further disclosed herein. The micro-sensors or sensor rings may further wirelessly transmit the at least one sensed attribute and may switch back to the dormant state, after the transmission. The wireless transmission by the micro-sensors or sensor rings may be in any applicable format such as RF (including LoRa radio), sonic, or the like. As an example, a sonic transmission may be carried via one or more materials including a casting material (e.g., a cylindrical casting material with an internal lumen).

The wireless transmissions by the micro-sensors or sensor rings may be received by a relay, of a plurality of relays, of a relay system. The relay system may have a plurality of relays located at various depths between the surface of the earth and/or a surface receiver and the micro-sensors. The relay system may be set up such that a first relay or set of relays (e.g., a relay or set of relays closest to the micro-sensors) may receive the wireless transmissions transmitted by the micro-sensors or sensor rings and, using stored power at the first relay or set of relays, may re-transmit the wireless transmission such that a subsequent second relay or set of relays may receive the transmission by the first relay or set of relays. This process may continue such that a version of the original wireless transmission by the micro-sensors or sensor rings is received at an above ground surface receiver, via a plurality of relays in the relay system. Relays in the relay system may be positioned (e.g., attached, clamped, soldered, taped, glued, etc.) onto an outside surface of a casting material and may be segmented at regular or irregular depths between the ground surface and the micro-sensors or sensor rings. The relay system may use LoRa communication to transmit sense data to the surface relay. However, other wireless communication methods may also be used, including, but not limited to, Bluetooth, Wi-Fi, or cellular.

According to an implementation, relays in the relay system may be powered by a component that may periodically recharge (e.g., on an annual or bi-annual basis) via, for example, ultrasonic power harvesting. The relay component may be charged wirelessly by, for example, harvesting energy from a charging device that transmits power (e.g., RF device, sonic drop, etc.) within the lumen of a casting. The wireless charging device may traverse the depths of the relays in the relay system, from a surface of the earth down to at least the deepest relay and charge each relay through proximity-based charging.

As an example, an antenna on each of the relays may receive the RF waves and generate a small current when energized by the RF waves. The small current may generate a small voltage which is amplified and rectified by a voltage multiplier circuit. An energy harvesting integrated circuit may be used to store the corresponding generated energy, in an on-board capacitor. The stored energy may be used to power and activate the tag, when sufficient energy has accumulated. Alternatively, or in addition, the relays may be powered, at least in part, by the signal transmitted by the micro-sensors.

For example, an RF signal or sonic signal transmitted by the one or more micro-sensors may include enough energy to power a relay such that the relay is activated and conducts a relay transmission of the received RF or sonic signal. Alternatively, or additionally, the relay transmitter may also include or be connected to a battery.

The wireless transmissions originating at the micro-sensors or sensor rings and relayed via the relay system may be received at an above ground surface receiver. The above ground surface receiver may include a processor, such as a general-purpose computer, which may be programmed in software to carry out functions described herein and/or to analyze the wireless transmissions originating at the micro-sensors and relayed via the relayed system. The software may be downloaded to the general-purpose computer in electronic form, over a network, for example, or it may, alternatively or additionally, be provided and/or stored on non-transitory tangible media, such as magnetic, optical, or electronic memory. Additionally, the surface receiver may be configured to provide the received data from the relay system, and/or other data generated by the surface receiver based on the received data, to additional components or networks (e.g., a server, a database, a cellular network, etc.). Alternatively, or additionally, the surface receiver may store the received data and/or analysis based on the received data in a memory that is either local or remote to the surface receiver.

The surface receiver may transmit the received data or an analysis of the received data via any applicable network or system generally known in the art such as an intranet, a local area network (LAN), a wide area network (WAN), a metropolitan area network (MAN), a direct connection or series of connections, a cellular telephone network, or any other network or medium. Such a network or system may be wired, wireless or a combination thereof. Wired connections may be implemented using Ethernet, Universal Serial Bus (USB), RJ-11 or any other wired connection generally known in the art. Wireless connections may be implemented using Wi-Fi, WiMAX, and Bluetooth, infrared, cellular networks, satellite or any other wireless connection methodology generally known in the art. Additionally, several networks may work alone or in communication with each other to facilitate communication in the network or system.

Figure 1:
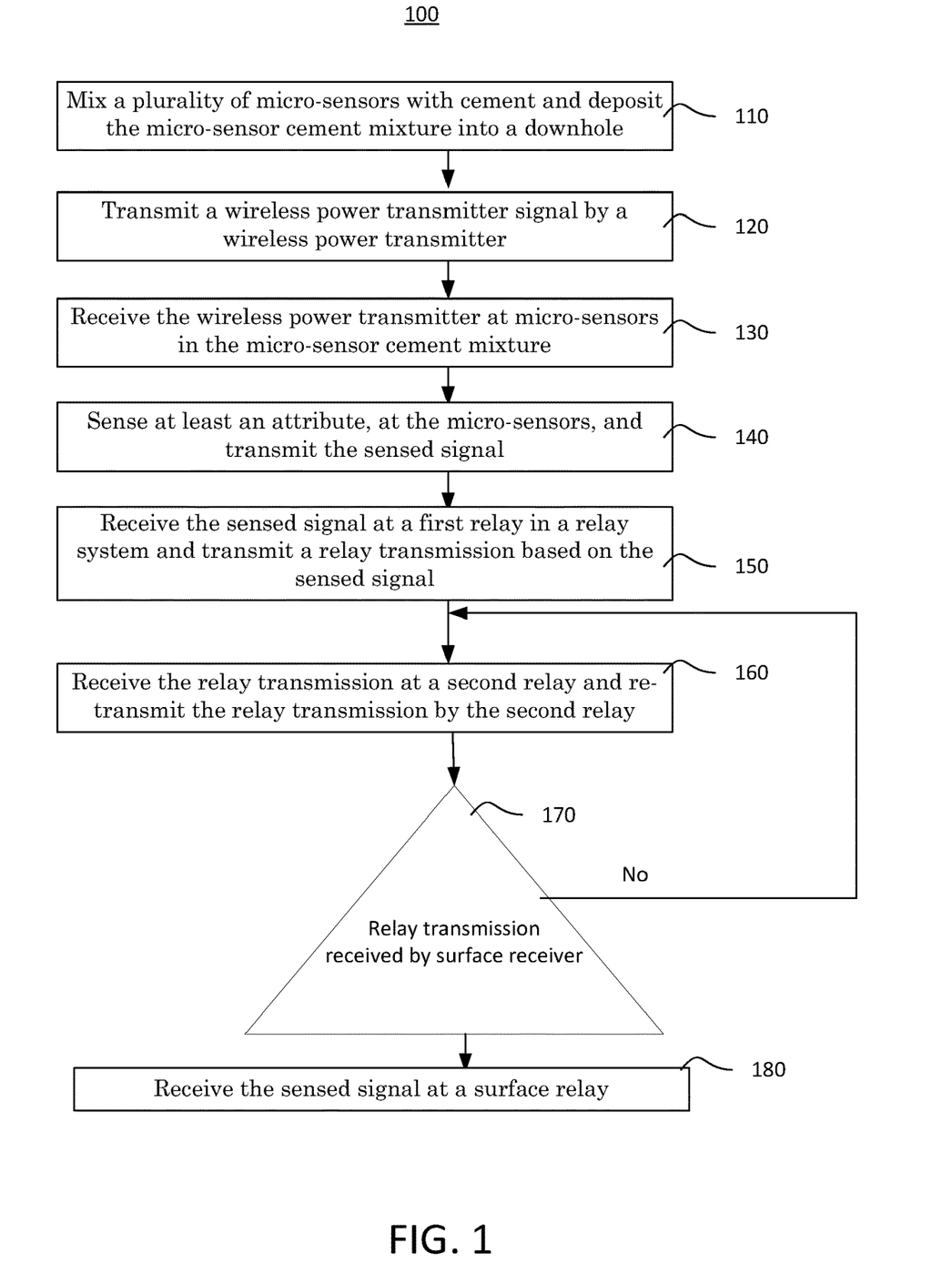
FIG. 1 is a flowchart for receiving properties, sensed underground, at a surface receiver, in accordance with implementations of the disclosed subject matter.

FIG. 1 shows an exemplary process 100 for implementing the techniques disclosed herein. At 110 of the process 100, a plurality of micro-sensors, as disclosed herein, may be mixed with a material suitable to be deposited in a downhole. The material may be cement and the micro sensors may be mixed with the cement using any applicable technique such as by an industrial cement mixer. The micro-sensors may be approximately 1 cm$^3$ and may be mixed at a ratio such that the number of micro-sensors does not materially alter the integrity of the material (e.g., cement) once the marital is deposited into a downhole and solidifies/settles. At 110, the mixture of the material and the micro-sensors may be deposited into the downhole. The mixture may be deposited such that, for example, it settles outside of the annulus created by a casting that is inserted into the downhole.

Figure 4:
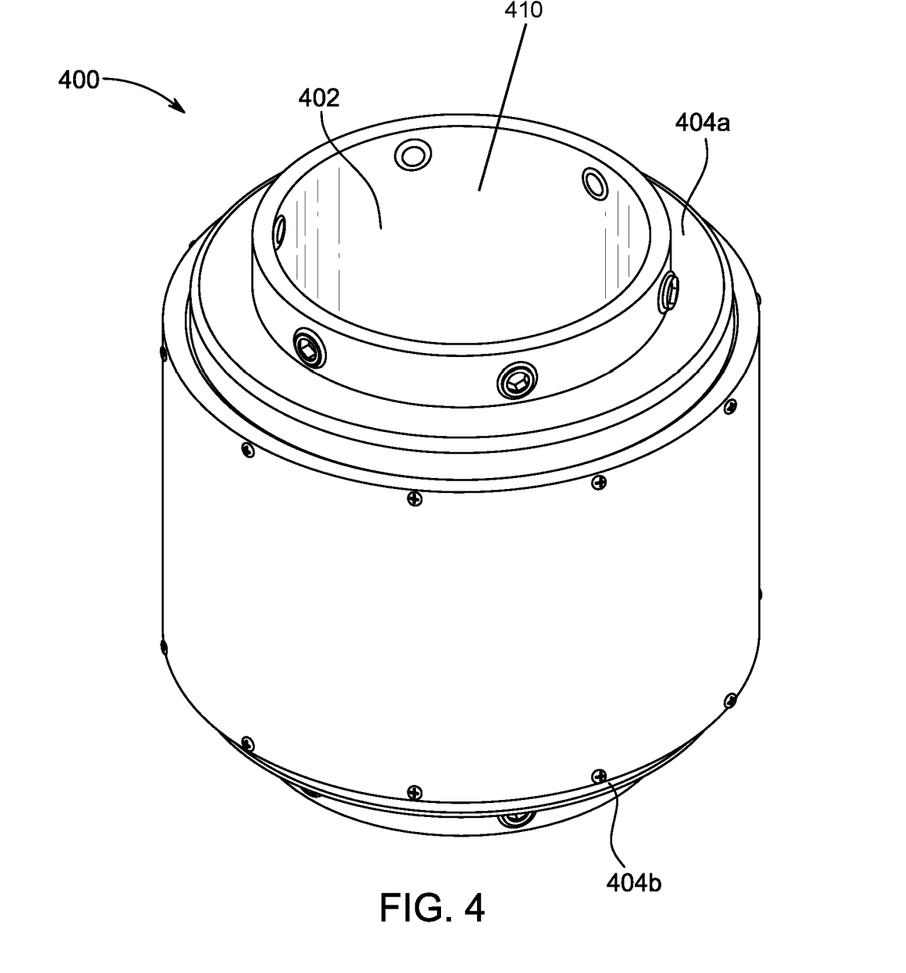
FIG. 4 is an example sensor ring in accordance with implementations of the disclosed subject matter.
Figure 5:
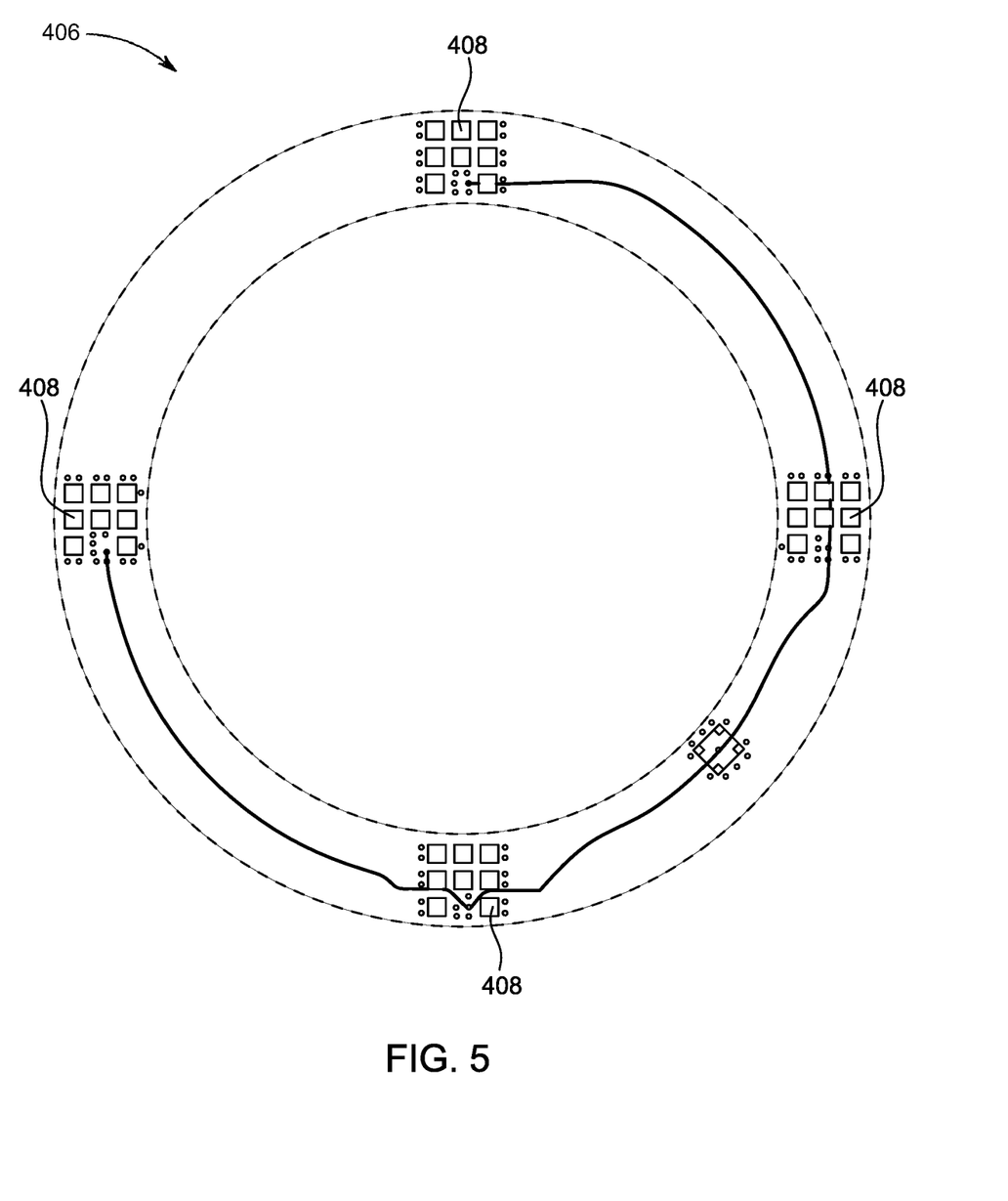
FIG. 5 is an example antenna array in accordance with implementations of the disclosed subject matter.

In the alternative, sensor rings (as described in further detail below and as shown in FIGS. 4 and 5), may be fastened onto the casings at pre-determined intervals.

Figure 2:
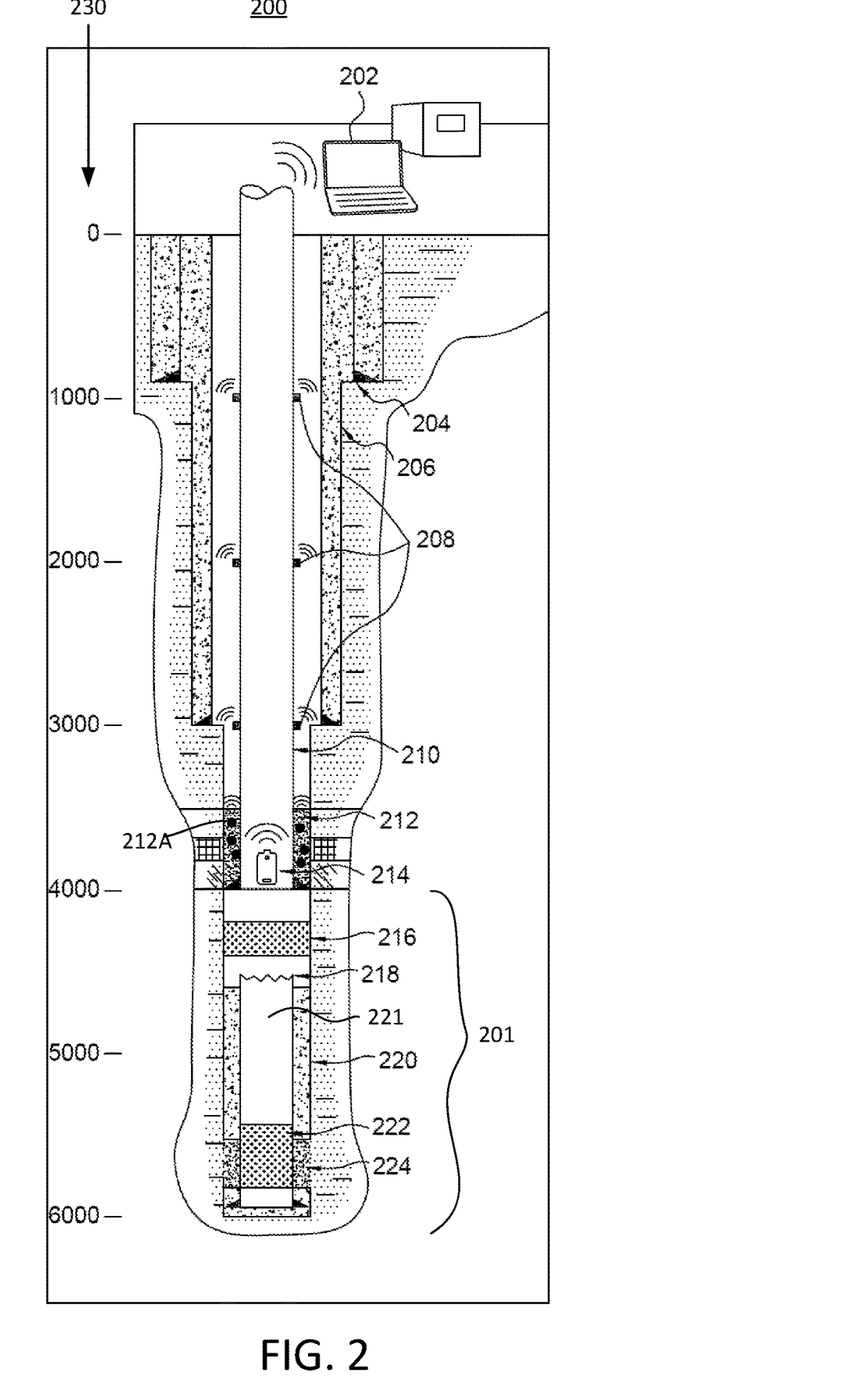
FIG. 2 is diagram of an example downhole, in accordance with implementations of the disclosed subject matter.

FIG. 2 shows a diagram of a downhole 200 in accordance with the subject matter disclosed herein. As shown in FIG. 2, the downhole 200 may include a plugged section 201 that is inaccessible from the ground surface. The plugged section 201 may correspond to an initial section dug during the creation of the downhole 200. The plugged section 201 may include squeeze cement 222 that is surrounded by perforations 224. Perforations 224 may be created naturally or may be created by machinery used to create the downhole. Original casting 221 may be positioned above the squeeze cement 222. The original casting 221 may be surrounded by an original cement 220 which may be annularly deposited around the brine 221. The original casting 221 may be capped at a cut-off casting point 218 such that the cut-off casting point 218 is positioned towards the ground surface and away from the squeeze cement 222. The cut-off casting point 218 may be a termination of the original casting 221.

The plugged section 201 may be a portion of the downhole 200 that is unusable and/or inaccessible such that the techniques disclosed herein including the process 100 of FIG. 1 are generally implemented over the plugged section 201, towards the ground surface. According to implementations of the disclosed subject matter, the plugged section 201 may not be present or a subset of the components of the plugged section 201 may be present.

As shown in FIG. 2, an area above the plugged section 201 may include a casting 210. An underground end of the casting 210 may correspond to the end proximate to the plugged section 201 and is at the opposite side of the casting 210 that is proximate to the ground surface or above the ground surface. As shown by the depth axis 230, in the example provided in FIG. 2, the underground end of the casting 210 is at approximately 4000 feet below the ground surface, which is indicated by 0 feet on the depth axis 230.

As disclosed, at 110 of process 100 of FIG. 1, a mixture of a material including the micro-sensors and the cement may be deposited into a downhole. In the example diagram provided in FIG. 2, a micro-sensor cement mixture 212 may be deposited into the downhole 200 such that it settles proximate to the underground end of the casting 210 and forms an annular shape around the casting 210. The micro-sensor cement mixture 212 includes micro sensors 212A and may occupy a space between the strata (e.g., earth foundation, rock, soil, etc.) and the casting 210 such that the micro-sensor cement mixture 212 forms a cylindrical shape around the casting 210. Micro-sensors 212A may be configured to receive wirelessly transmitted power (e.g., by wireless power transmitter 214, as further disclosed herein) and may activate based on the receipt of the wirelessly transmitted power. Upon activation the micro-sensors 212A may be configured to sense at least one attribute (e.g., a temperature, a stress, a pressure, a density, a presence of an element, molecule, or compound, a saturation, a pH level, or the like).

According to an implementation, the micro-sensor cement mixture 212 may settle such the height of the micro-sensor cement mixture 212 from its greatest depth (e.g., at approximately the same or similar depth as the underground end of the casting 210) to its shallowest depth is between 250 feet to 1000 feet. For example, as shown in FIG. 2, the greatest micro-sensor cement mixture 212 depth is approximately 4000 feet from the ground surface and the shallowest micro-sensor cement mixture 212 depth is approximately 3500 feet from the ground surface. It will be understood that the depths and configuration of the micro-sensor cement mixture 212 provided in FIG. 2 are examples only and that the techniques and implementations disclosed herein may be implemented using other underground depths at which current wireless transmissions cannot reach the ground surface and configurations (e.g., configurations other than the annular shape of the settled micro-sensor cement mixture 212).

According to an implementation of the disclosed subject, different micro-sensors 212A or sensor rings may settle at different depths within the micro-sensor cement mixture 212. For example, a micro-sensor cement mixture 212 may span over a depth of 500 ft (or, for example, over a range of 200-1000 ft) such that a first micro-sensor is located at a shallow depth within the 500 ft span and a second micro-sensor is located at a deeper depth within the 500 ft span.

Each micro-sensor or sensor ring may have an identifier associated with the micro sensor such that, for example, the first micro-sensor or sensor ring may have a first identifier and the second micro-sensor or sensor ring may have a second identifier. After the micro-sensor cement mixture 212 has settled or the sensor rings have been installed, a depth detection tool (e.g., a sonic tool) may be inserted past the different depths that the micro-sensor cement mixture 212 spans. It will be understood that the depth detection tool may be used for other purposes (e.g., to measure porosity, to detect reservoir parameters, etc.).

However, such a tool may also function as a depth detection tool based on its ability to function as an energy source and transmitter. As an example, the depth detection tool may be inserted into the lumen within the casting 210 and may traverse down the depth of the casting 210. The depth detection tool may transmit an energy signal (e.g., an acoustic energy signal) as it passes past different depths spanned by the micro-sensor cement mixture 212 or sensor rings and individual micro-sensors or sensor rings may be activated and transmit a response signal as the depth detection tool is proximate to each individual micro-sensor or sensor ring.

For example, a sonic tool may be inserted within the lumen of casting 210 and may reach a depth of 3600 ft below the ground surface. The sonic tool may emit an acoustic energy signal at 3600 ft and the first micro-sensor or sensor ring may activate. Notably the first micro-sensor or sensor ring proximate to the sonic tool at the given depth (e.g., 3600 ft) may harvest the energy emitted by the sonic tool and activate. Upon activation, the first micro-sensor or sensor ring proximate to the sonic tool may transmit a data packet including its unique micro-sensor ID as well as other sensed information (e.g., temperature value). As disclosed herein, the transmitted data packet may be received by a first relay and thereafter by a chain of relays up to a surface receiver. Accordingly, surface receiver may associate the first micro-sensor's micro-sensor ID or first sensor ring's sensor ring ID with a depth of 3600 ft.

Similarly, the sonic tool may be inserted into a deeper depth and may emit an acoustic energy signal at 3800 ft and the second micro-sensor or second sensor ring may activate and transmit data packet including the second micro-sensor's micro-sensor ID or second sensor ring's sensor ring ID. The data packet may be received by a relay closest to the second micro-sensor or second sensor ring and thereafter by a chain of relays up to the surface receiver.

Accordingly, the surface receiver may associate the second micro-sensor's micro-sensor ID or second sensor ring's sensor ring ID with a depth of 3800 ft. A vertical profile of each micro-sensor in the micro-sensor cement mixture 212 or sensor ring may be generated based associating different micro-sensors or sensor rings with different depths. Such a vertical profile may be generated during an initialization period and/or may also be generated or updated at periods after an initialization period.

According to another implementation, a depth detection tool may receive the micro-sensor IDs or sensor ring IDs of different micro-sensors or sensor rings as the depth detection tool traverses different depths. According to this implementation, the depth detection tool may register the micro-sensors or sensor rings at their corresponding depths, based on receiving respective micro-sensor IDs or sensor ring IDs while the depth detection tool is at the respective depths.

As further disclosed herein, a recharging tool, which may be the same as the depth detection tool (e.g., sonic tool) may be lowered to the depths of the plurality of micro-sensors or sensor rings based on the generated vertical profile. The recharging tool may be inserted at each of the depths associated with the depths of the micro-sensors or sensor ring and may emit energy while inserted at each of those depths for a given period of time. Accordingly, the micro-sensors or sensor ring may harvest the energy emitted by the wireless power emitting tool and re-charge their respective batteries.

It will be understood that the values provided herein (e.g., depth values, micro-sensor size, etc.) are examples only and the subject matter disclosed herein may be implemented with values that are different than those provided herein.

As also shown at FIG. 2, a wireless power transmitter 214 may be provided proximate to the underground end of the casting 210. The wireless power transmitter 214 may be installed proximate to the underground end of the casting 210 during construction of the downhole 200 or may be inserted through the lumen of the casting 210 to be positioned proximate to the underground end of the casting 210. The wireless power transmitter 214 may be adjacent to or attached to a surface of the casting, may be adjacent to or attached to another mechanical structure, may be adjacent to or attached to the strata, or may otherwise be positioned such that it is able to transmit wireless power signals to relays in the relay system. The wireless power transmitter may include a stored pre-charged battery and may occupy a given amount of space within the downhole 200. For example, the wireless power transmitter 214 may have a height of, for example, 30-70 feet or less. According to an example, as shown in FIG. 2, the depth of the wireless power transmitter 214 may overlap with the depth of the micro-sensor cement mixture 212 or sensor rings.

At 120 of the process 100 of FIG. 1, a wireless power transmitter (e.g., wireless power transmitter 214 of FIG. 2) may cycle from a dormant state to an active state and may transmit a wireless power transmitter signal through a give mode (e.g., RF transmission) while in the active state, before returning to the dormant state. The wireless power transmitter 214 may remain in a dormant state for a majority of a given cycle such that the wireless power transmitter conservers its stored charge for a large duration of time, such as over one year. Batteries contained within the wireless power transmitter may be stored in a battery carrier that is part of the wireless power transmitter. The wireless power transmitter, as disclosed herein, may be a standalone component that may be configured to be positioned into or extracted out of a downhole using industry standard downhole positioning and/or extraction tools. Such positioning and/or extraction may allow for efficient exchanging or recharging of the batteries. According to an implementation, the batteries in the wireless power transmitter may be recharged and/or exchanged using extraction and/or positioning tools at the same time as the batteries of the relays are charged (e.g., via a wireless transmission by, for example, a sonic tool). Such a coupling of the tasks may reduce down-time and may also be a cost-effective.

The wireless power transmitter 214 may include a clock, such as a micro-clock, that is configured to transmit a signal (e.g., a periodic signal or an aperiodic signal) based on predetermined criteria or dynamically determined criteria. The wireless power transmitter 214 may be configured to change from a dormant state to an active state based on the transmission of the signal by the clock. The clock may transmit a signal based on pre-determined criteria such that the pre-determined criteria may be programmed into hardware, software, or firmware related to the wireless power transmitter 214. Alternatively, the clock may transmit a signal based on dynamically determined criteria, the dynamically determined criteria being determined based on any one or more of a number of factors including a battery amount status, an environmental factor, an industrial factor, a sensor reading, a past reading, or the like.

The wireless power transmitter may include one or more batteries, electrical wiring (e.g., an electrical wiring harness), circuitry containing the clock, and a transmitter to transmit wireless power transmitter signals. A power broadcasting antenna may be also be included in the wireless power transmitter and may be printed conformally onto the wireless power transmitter.

The wireless power transmitter may cycle to an active state and transmit a wireless power transmitter signal that wirelessly transmits energy. The wireless power transmitter signal may be an RF signal, a sonic signal, a near field communication (NFC) signal, or the like. According to an implementation, the wireless power transmitter signal may be carried through one or more wavelengths at one or more frequencies and may travel through air and/or other material such as brine, mud, through materials of the wireless power transmitter, wellbore fluid surrounding the wireless power transmitter, casing material, cement surrounding the micro-sensors, According to an implementation, the wireless power transmitter signal may be carried acoustically via vibrations in the air or one or more other material.

At 130 of the process 100 of FIG. 1, the wireless power transmitter signal transmitted by the wireless power transmitter 214 may be received by the sensor ring or micro-sensors 212A of the micro-sensor and cement mix 212. The micro-sensors 212A or sensor rings may convert the received wireless power signal and convert the wireless power signal into a current that is used to activate and power a sensing component in each of the micro-sensors 212A. Upon activation, each sensing component senses at least one attribute (e.g., a temperature, a stress, a pressure, a density, a presence of an element, molecule, or compound, a saturation, a pH level, or the like). At 140 of the process 100 of FIG. 1, micro-sensors (e.g., micro-sensors 212A of FIG. 2) or sensor rings utilize a portion of the received wireless power signal and wirelessly transmit the at least one attribute sensed by respective of each of the micro-sensor's sensing components via a sensor transmission. The power of the sensor transmissions by the micro-sensors 212A or sensor rings may have an amplitude such that the transmission cannot reach the ground surface without significant attenuation, such that the transmission cannot be materially received and analyzed by the ground receiver 202.

At 150 of the process 100 of FIG. 1, at least one relay (e.g., relays 208 of FIG. 2) in a relay system may receive the sensor transmission transmitted by the micro-sensors 212A or sensor rings. As further disclosed herein, the relay system may be arranged such that the sensor transmissions by the micro-sensors 212A or sensor rings are relayed to the ground surface and are received by the surface receiver 202 with a high enough amplitude such that the surface receiver 202 may analyze the respective sensor transmissions. As shown in FIG. 2, relays 208 may be arranged at periodic or aperiodic depths between the depth of the sensor rings or micro-sensor cement mix 212 and the ground surface. The relays 208 may be located at any applicable location between the depth of the sensor rings or sensor cement mix 212 and the ground surface and the number of relays 208 and the space between each respective relay of relays 208 may be determined based on the overall depth between the sensor rings or micro-sensor cement mix 212 and the ground surface and the range that each relay of the relays 208 is able to transmit a given signal.

At 150 of the process 100 of FIG. 1, the at least one relay in the relay system that receives the sensor transmission, transmitted by the micro-sensors 212A or sensor rings, transmits a relay transmission. The relay transmission includes at least a payload contained the sensor transmission received by the relay such that the at least one sensed attribute sensed by one or more micro-sensors 212A or sensor rings and/or information associated with a sensor's ID is contained in the relay transmission. As disclosed herein, the relay transmission may be transmitted using stored power stored in the relays 208 (e.g., a battery) or, alternatively, may at least partially be transmitted based on power provided by a sensor transmission.

At 160 of the process 100 of FIG. 1, the relay transmission transmitted at 150 may be re-transmitted by a second relay and continue to be transmitted by a number of second relays of the relays 208 in the relay system, until the relay transmission traverses the depth of the downhole 200 from a deep depth to shallower depths per relay re-transmission, and reaches the ground receiver 202.

According to implementations, the relays 208 in the relay system may be configured such that each given relay of the relays 208 determines whether a given relay transmission received at the given relay originated from a relay that is at a deeper depth within the downhole 200 or at a shallower depth within the downhole 200, relative to the given relay. The given relay may not re-transmit a relay transmission that is received from a relay that is at a shallower depth when compared to the given relay (i.e., the relay system does not result in transmissions back towards a deeper depth). As an example, relay transmissions may include header information (e.g., the header of a relay transmission packet) that comprises the location or identification of the relay transmitter that a relay re-transmission is transmitted from. Based on the location information or identification information, a relay that receives the relay re-transmission may be able to determine whether to further re-transmit the received re-transmission (e.g., if the relay re-transmission is from a deeper relay) or to ignore the received re-transmission (e.g., if the relay re-transmission is from a shallower relay).

According to an implementation of the disclosed subject matter, a relay in receipt of a re-transmission may transmit an acknowledgement transmission indicating that the relay is in receipt of the relay re-transmission. Further, the relays (e.g., relays 208 of FIG. 2) in a relay system may continue to re-transmit a given transmission (e.g., at a predetermined periodic time period) until an acknowledgment transmission is received at the re-transmitting relay.

The re-transmission portion in 160 of the process 100 of FIG. 1 may be repeated for a number of iterations until the re-transmissions reach a ground surface, is received by a ground receiver (e.g., ground receiver 202 of FIG. 2), or is re-transmitted by the shallowest relay in the relay system.

At 180 of the process 100 of FIG. 1, a surface receiver (e.g., surface receiver 202) may receive a relay re-transmission transmitted by a sub-ground relay. The surface receiver 202 may be any component that includes a processor and may be a system of components such as, for example, a processor, a memory, a wireless receiver and transmitter, a display and the like. The surface receiver 202 may transmit an acknowledgement signal which may be received by a relay of the relays 208 (e.g., the shallowest relay of the relays 208 of a relay system). Upon receipt of the acknowledgement signal transmitted by the surface receiver and received by the relay (e.g., the shallowest relay of the relays 208 of a relay system), the relay may suspend further re-transmission based on receipt of the acknowledgement signal.

The surface receiver may extract the data sensed by the micro-sensors (e.g., micro-sensors 212A of FIG. 2) or sensor rings and may either store, transmit, and/or analyze the data. For example, the surface receiver may determine the change in temperature at or about the depth of the micro-sensors 212A or sensor rings, over a period of time, based on signals transmitted by the micro-sensors 212A or sensor rings. According to an implementation, the surface receiver may determine a sub-surface attribute at different depths based on the depth of each of the micro-sensors 212A or sensor rings, as registered by a detection tool, as disclosed herein.

According to an implementation, the surface receiver may utilize the received data sensed by the micro-sensors or sensor rings to analyze and/or provide attribute information (e.g., a chart, a table, etc.) relative to the depth of the plurality of micro-sensors or sensor rings over a time period. As an example, an attribute sensed by a plurality of micro-sensors or sensor rings may be temperature. The plurality of micro-sensors or sensor rings may transmit sensed temperature data to a surface receiver, via a plurality of relays at a first time and then again at a second time. The surface receiver may provide an indication (e.g., chart) of the temperature change between the first time and the second, at the various depths corresponding to the micro-sensors or sensor rings.

A recharging tool (e.g., a sonic tool), as disclosed herein, may be inserted past the different depths that relays in the relay system span. As an example, the recharging tool may be inserted into the lumen within the casting 210 and may traverse down the depth of the casting 210. The recharging tool may transmit an energy signal (e.g., an acoustic energy signal) as it passes past different depths spanned by the relays 208 in the relay system and individual relays 208 in the relay system may receive the energy signal and recharge a corresponding charging component such as a battery of each of the relays 208 in the relay system. An antenna on each of the relays may receive the energy signal and generate a small current when energized by the energy signal. The current may generate a voltage which is amplified and rectified by a voltage multiplier circuit. An energy harvesting integrated circuit may be used to store the corresponding generated energy, in a relay battery. The stored energy may be used to power and activate the relay, when sufficient energy has accumulated. Such a recharging tool may be inserted past the different depths periodically to charge the relays in a relay system, as disclosed herein.

Figure 3:
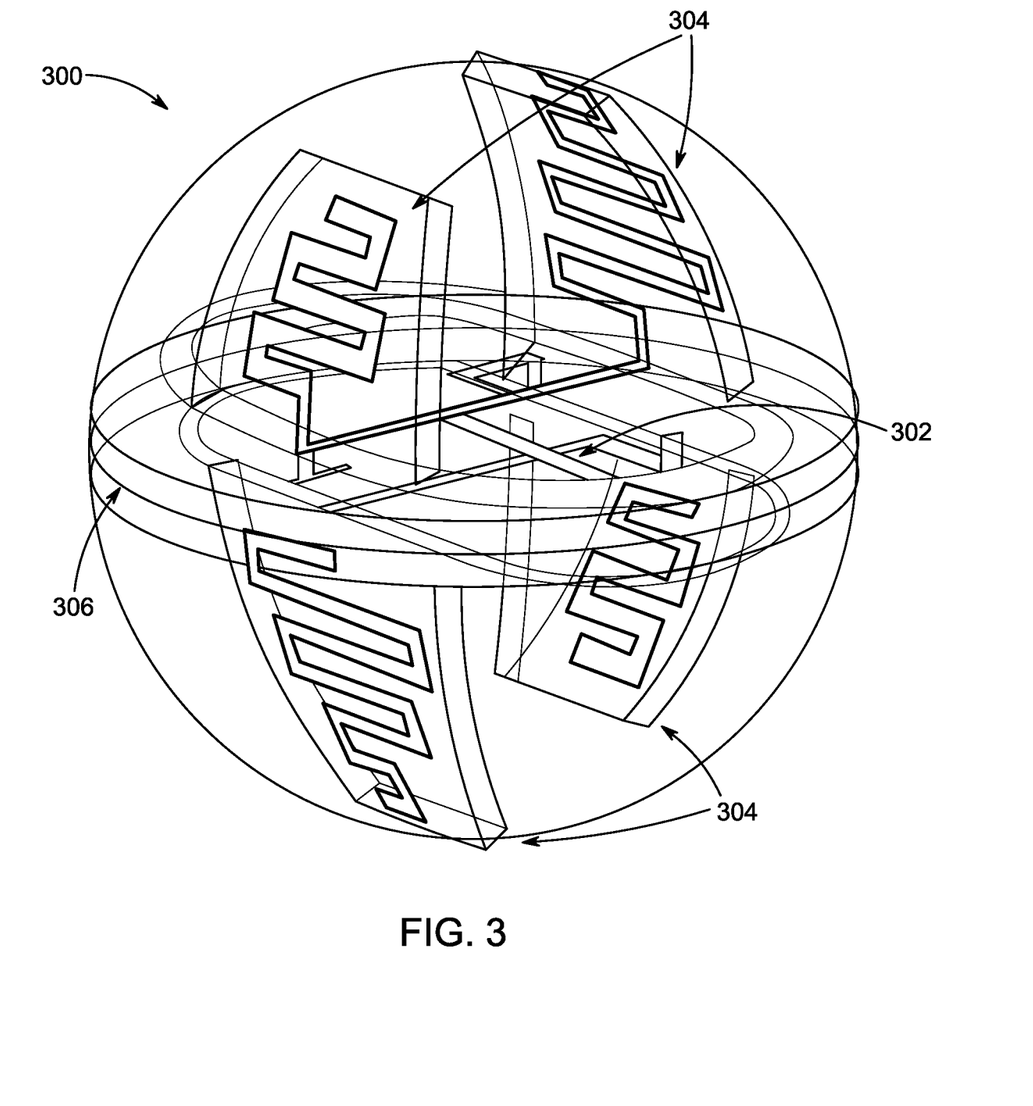
FIG. 3 is an example micro-sensor in accordance with implementations of the disclosed subject matter.

FIG. 3 shows an exemplary embodiment of a micro-sensor 300 that may be mixed with cement. As seen in FIG. 3, the micro-sensor may include a double circuit 302, receive and transmit sensing repeat antennas 304, and ground 306.

As described above, in another embodiment, a plurality of senor rings are fastened onto the casings at pre-determined intervals. FIG. 4 shows an exemplary sensor ring 400. The sensor ring 400 includes in interior area 402 that surrounds the exterior the casing. The sensor ring 400 also includes phenolic rings 404 a and 404 b that protect the antenna arrays 406. The sensor ring 400 also includes a sensing component 410 configured to sense at least one attribute of a downhole (e.g., oil well).

One antenna array 406 may be located near the top of the sensor ring 400 while another antenna array 406 may be located near the bottom of the sensor ring 400. One antenna array 406 may be used to receive data from other sensor rings, while another antenna array 406 may be used to relay sensor data to other sensor rings. For example, in one embodiment, bottom antenna array 406 may receive data from a sensor ring located beneath the bottom antenna array 406 and top antenna array 406 may relay that data to a sensor ring located above the top antenna array 406.

Each antenna array 406 may include one or more antennas 408. The antennas 408 may be 2.4 GHz antennas.

FIG. 5 shows a cross-section of the sensor ring 400. As shown in FIG. 5, each antenna array 406 may include one or more antennas 408 that relay the sensed signal to the surface relay as described above.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed:

1. A first sensor ring for use in subsurface monitoring of an downhole, the first sensor ring comprising:
    a first antenna array;
    a second antenna array; and
    a sensing component configured to sense at least one attribute of the downhole;
    wherein the sensor ring is configured to be fastened to a casing of the oil well;
    wherein the first antenna array is configured to receive a communications signal from a second sensor ring in a relay system;
    wherein the first antenna array is configured to transmit the communications signal to the second antenna array; and
    wherein the second antenna array is configured to transmit communications signals to a third sensor ring in the relay system.

2. The first sensor ring of claim 1, wherein the first sensor ring includes an interior area that surrounds an exterior of the downhole.

3. The first sensor ring of claim 1, wherein the downhole is an oil well.

4. A system for subsurface monitoring, the system comprising:
- a downhole, the downhole comprising:
  - a casting comprising a lumen;
  - a wireless power transmitter, configured to be deployed within the casting and to transmit a wireless power signal;
  - a micro-sensor cement mixture comprising a plurality of micro-sensors mixed with a cement;
  - a relay system comprising a plurality of relays, each of the plurality of relays comprising a charging component configured to receive the wireless power signal; and
  - a surface receiver configured to receive information from at least one of micro-sensor of the plurality of micro-sensors via the plurality of relays; and
- a depth detection tool configured to be deployed within the casting and to determine a micro-sensor vertical profile.

5. The system of claim 4, further comprising:
- at least one micro-sensor of the plurality of micro-sensors configured to receive the wireless power signal, sense at least one attribute, and transmit a sensed signal;
- a first relay of the relay system configured to receive the sensed signal and re-transmit the sensed signal at a first time;
- a second relay of the relay system configured to receive the re-transmitted sensed signal and re-transmit the sensed signal at a second time after the first time; and
- a surface receiver configured to receive the sensed signal at a third time after the second time.

6. The system of claim 4, further comprising a recharging tool configured to transmit a power signal.

7. The system of claim 6, wherein the plurality of relays are configured to receive the power signal transmitted by the recharging tool.

8. The system of claim 7, wherein a charging component of each of the plurality of relays is configured to store a charge based on receiving the power signal.

9. The system of claim 4, wherein the micro-sensor cement mixture is placed on a surface of the casting opposite from the lumen.

10. The system of claim 4, further comprising a micro-clock configured to activate the wireless power transmitter at one of a periodic time and a dynamic time.

* * * * *

UNITED STATES PATENT AND TRADEMARK OFFICE
CERTIFICATE OF CORRECTION

PATENT NO. : 11,459,878 B2  
APPLICATION NO. : 17/193768  
DATED : October 4, 2022  
INVENTOR(S) : Ashwin Pasumarti et al.

Page 1 of 1

It is certified that error appears in the above-identified patent and that said Letters Patent is hereby corrected as shown below:

In the Specification

After the priority claim paragraph:
Insert -- This invention was made with government support under DE-FE0031850 awarded by Department of Energy. The government has certain rights in the invention. --

Signed and Sealed this
Twenty-ninth Day of August, 2023

Katherine Kelly Vidal
*Director of the United States Patent and Trademark Office*